United States Patent [19]

Miller et al.

[11] Patent Number: 5,920,159
[45] Date of Patent: Jul. 6, 1999

[54] MULTI-FUNCTIONAL APPARATUS EMPLOYING A FLEXIBLE DRIVE ELEMENT FOR SELECTIVELY ACTUATING MULTIPLE OUTPUT SYSTEMS

[75] Inventors: Robin Mihekun Miller, Ellington, Conn.; Daniel D Kilker, Canton; Monte L. Falcoff, Beverly Hills, both of Mich.

[73] Assignee: UT Automotive Dearborn, Inc., Dearborn, Mich.

[21] Appl. No.: 08/948,383

[22] Filed: Oct. 9, 1997

[51] Int. Cl.$^6$ ....................................................... H02K 7/14
[52] U.S. Cl. ................................... 318/4; 318/9; 318/445; 49/352; 49/502
[58] Field of Search ...................... 318/4, 9–15, 280–286, 318/445–455; 49/348, 352, 502; 74/434–437, 500.5; 292/240, 242, 197; 70/237–251

[56] References Cited

U.S. PATENT DOCUMENTS 2,271,207  1/1942  Rhein .
2,615,945  10/1952  Jaeschke .

(List continued on next page.)

FOREIGN PATENT DOCUMENTS

| | | |
|---|---|---|
| 0 345 002 A2 | 6/1989 | European Pat. Off. . |
| 822 178 | 11/1951 | Germany . |
| 28 16 207 A1 | 10/1979 | Germany . |
| 3807087 A1 | 9/1989 | Germany . |
| 39 23 688 A1 | 10/1991 | Germany . |
| 43 13 363 A1 | 11/1993 | Germany . |
| 43 37 760 A1 | 5/1994 | Germany . |
| 196 45 611 A1 | 5/1998 | Germany . |
| 56-22150 | 2/1981 | Japan . |
| 5-86761 | 6/1993 | Japan . |
| 2 153 218 A | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

Patent Abstracts of Japan, vol. 016, 7–438 (M–1309), Sep. 11, 1992 for JP Patent Publication No. 04151351.
p. 100, *Machine Design*, 60 (1988) Oct. 13, No. 24, Cleveland, Ohio, US.
"Goodheart–Wilcox Automotive Encyclopedia", William K. Toboldt, Larry Johnson, Steven W. Olive, 1989, pp. 723–727.
"Automotive Handbook", Bosch 3rd Edition, 1993, pp. 694–697.
"Kinematic Analysis of Mechanisms", 1959, J.E. Shigley, pp. 228–231.
"Genevamation Indexing Drives", Jan. 12, 1995 Catalog No. 693, Geneva Mechanisms Corporation.
"Saab 900 Owners Workshop Manual", Haynes Publishing Group, 1979 through 1985, pp. 172–174, 237.
Machine Design, "Basics of Design Engineering", Jun. 1992, "Article Mechanical Systems".
A paper from the Third Conference on Mechanisms, "Survey of Intermittent–Motion", F.J. Bogardus, 1956, pp. 8–15.
Machine Design, "Mechanisms for Intermittent Motion", Dec. 1951, Otto Lichtwitz, pp. 134–148.

(List continued on next page.)

*Primary Examiner*—Brian Sircus
*Attorney, Agent, or Firm*—Harness, Dickey & Pierce, P.L.C.

[57] ABSTRACT

In accordance with the present invention, the preferred embodiment of a multi-functional apparatus employing a flexible drive element for selectively actuating multiple output includes an electromagnetic device and a flexible drive element with a plurality of members thereon. In another aspect of the present invention, a flexible closed loop drive element in response to selective energization of an electric motor, and at least one rotatable member is coupled to one accessory such as a window wiper. The member attached to the drive element are arranged in a loop motion or discontinuous manner and selectively engage the rotatable member and thus actuate the attached accessory.

20 Claims, 9 Drawing Sheets

U.S. PATENT DOCUMENTS

| | | |
|---|---|---|
| 2,659,237 | 11/1953 | Wood . |
| 2,722,617 | 11/1955 | Cluwen et al. . |
| 2,959,803 | 11/1960 | Ziegler . |
| 3,361,005 | 1/1968 | Carpenter . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,523,204 | 8/1970 | Rand . |
| 3,574,882 | 4/1971 | Petry . |
| 3,583,250 | 6/1971 | Kongelka . |
| 3,619,676 | 11/1971 | Kawakami . |
| 3,659,128 | 4/1972 | Danek . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,803,627 | 4/1974 | Schuscheng . |
| 3,858,922 | 1/1975 | Yamanaka . |
| 3,887,955 | 6/1975 | Jarvinen . |
| 3,917,330 | 11/1975 | Quantz . |
| 3,927,436 | 12/1975 | Inoue et al. . |
| 4,009,952 | 3/1977 | Badalich et al. . |
| 4,065,234 | 12/1977 | Yoshiyuki et al. . |
| 4,136,906 | 1/1979 | Ireland et al. ........................ 296/137 C |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,450,390 | 5/1984 | Andrei-Alexandru et al. . |
| 4,478,004 | 10/1984 | Andrei-Alexandru et al. . |
| 4,492,904 | 1/1985 | Graham . |
| 4,507,711 | 3/1985 | Ono et al. . |
| 4,553,656 | 11/1985 | Lense . |
| 4,573,723 | 3/1986 | Morita et al. . |
| 4,630,178 | 12/1986 | Mugford et al. . |
| 4,639,065 | 1/1987 | Kohler et al. . |
| 4,660,698 | 4/1987 | Miura . |
| 4,674,781 | 6/1987 | Reece et al. . |
| 4,702,117 | 10/1987 | Tsutsumi et al. . |
| 4,733,147 | 3/1988 | Muller et al. . |
| 4,875,053 | 10/1989 | Harada . |
| 4,878,398 | 11/1989 | Heinrich . |
| 4,885,512 | 12/1989 | Gille et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,081,792 | 1/1992 | Huebner ................................. 49/221 |
| 5,182,957 | 2/1993 | Bohmer et al. . |
| 5,214,440 | 5/1993 | Takahashi et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,315,735 | 5/1994 | I-Shin ................................. 15/250.22 |
| 5,333,351 | 8/1994 | Sato . |
| 5,355,061 | 10/1994 | Forhan . |
| 5,355,286 | 10/1994 | Flint . |
| 5,373,605 | 12/1994 | Austin ................................. 15/250.24 |
| 5,427,345 | 6/1995 | Yamakami et al. . |
| 5,462,337 | 10/1995 | Yamakami . |
| 5,519,258 | 5/1996 | Stroven et al. . |
| 5,528,959 | 6/1996 | Yamakami . |
| 5,691,586 | 11/1997 | Yonnet et al. . |
| 5,694,812 | 12/1997 | Maue et al. . |
| 5,730,028 | 3/1998 | Maue et al. . |

OTHER PUBLICATIONS

"Mechanisms for Providing Intermittent Rotary Motion", Product Engineering, Aug. 1949, pp. 116–117.

Machine Design, "Mechanisms for Intermittent Motion, Part 2", Jan. 1952, Otto LIchtwitz, pp. 127–141.

Machine Design, "Mechanisms for Intermittent Motion, Part 3", Feb. 1952, Otto Lichtwitz, pp. 146–155.

Machine Design, "Mechanisms for Intermittent Motion, Part4", Mar. 1952, Otto Lichtwitz, pp. 147–155.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mable and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

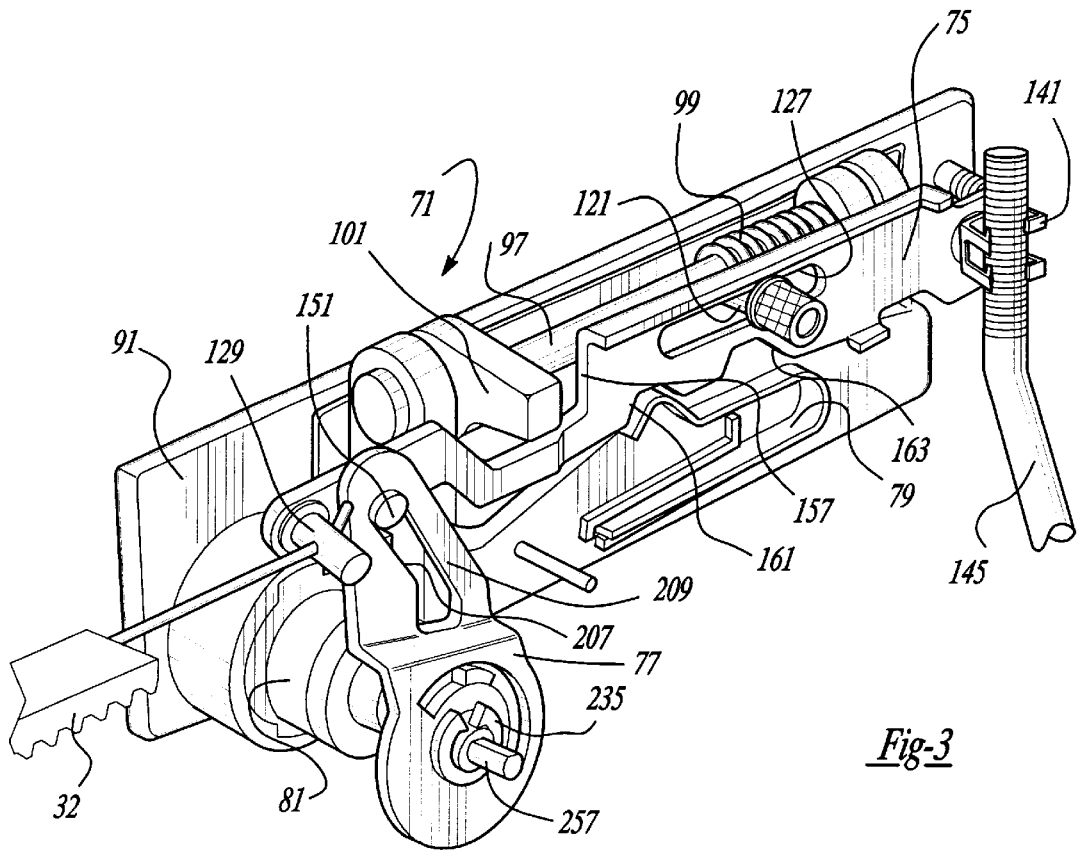
Fig-3
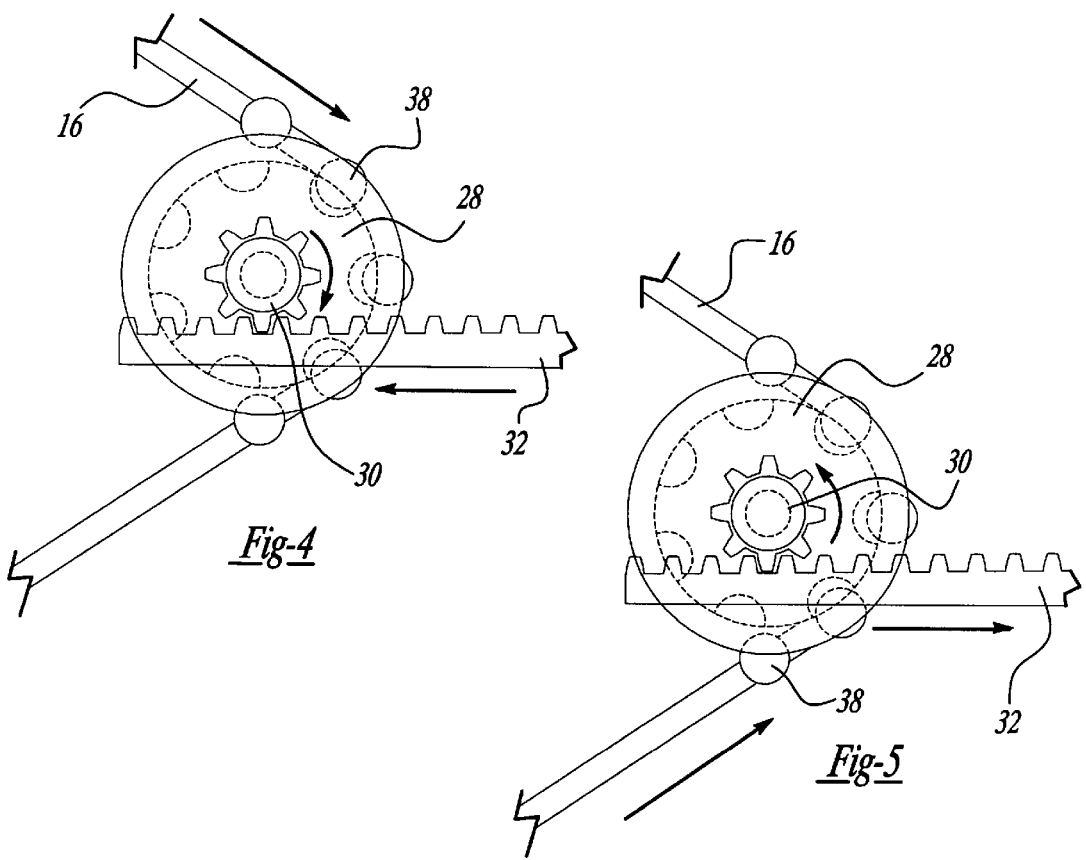
Fig-4
Fig-5

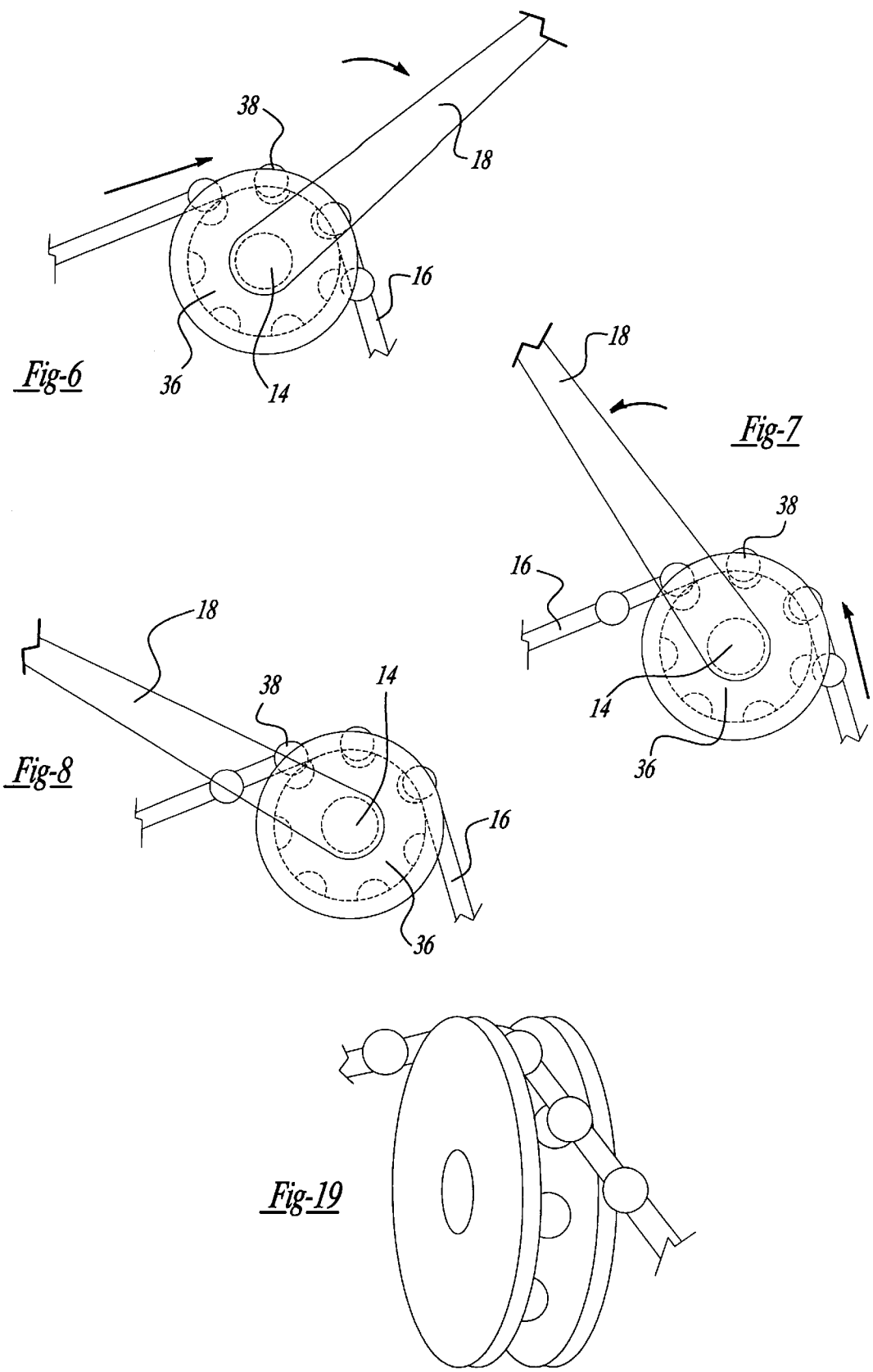

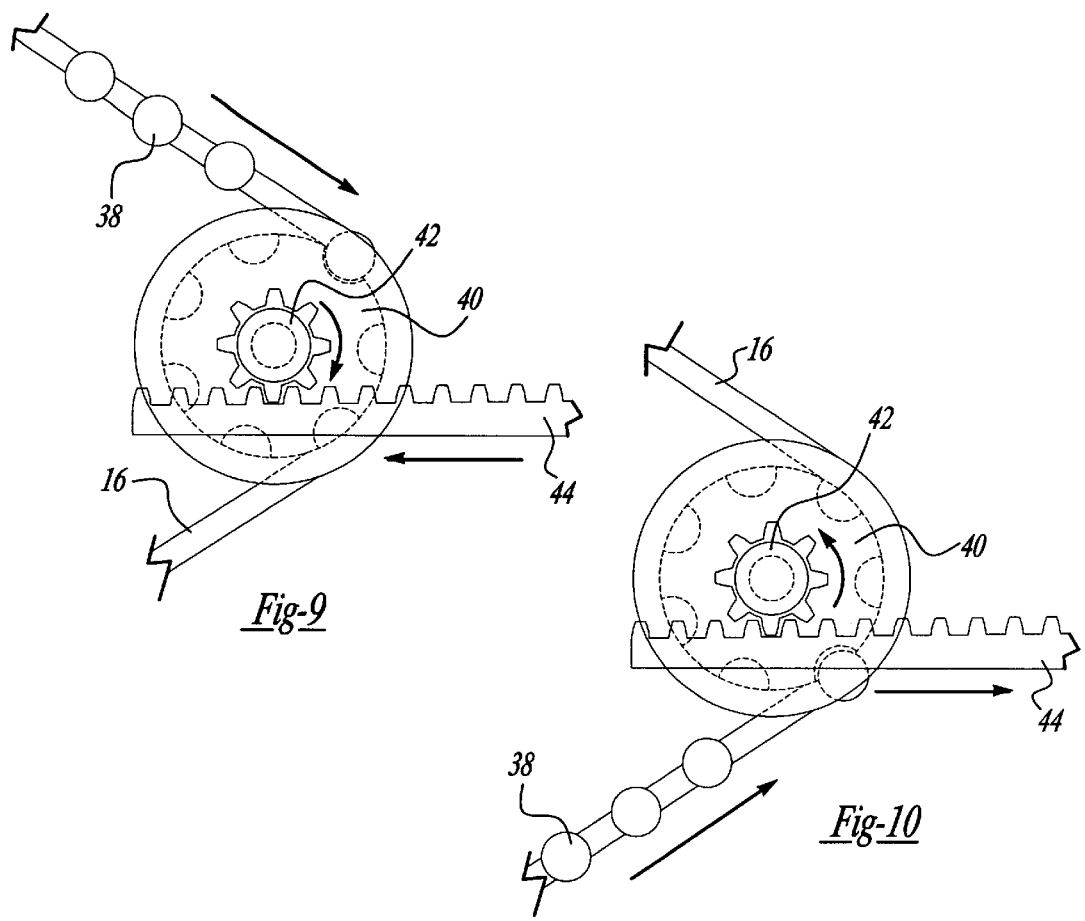
Fig-9
Fig-10
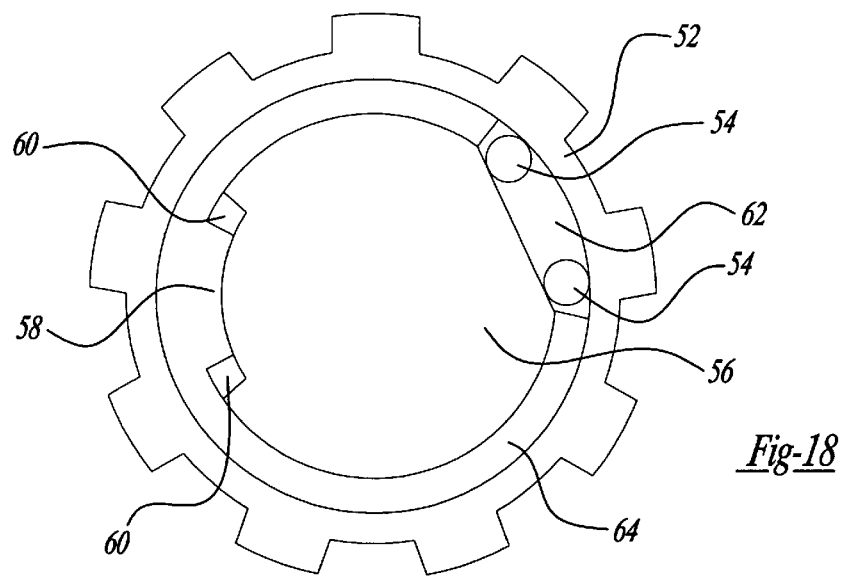
Fig-18

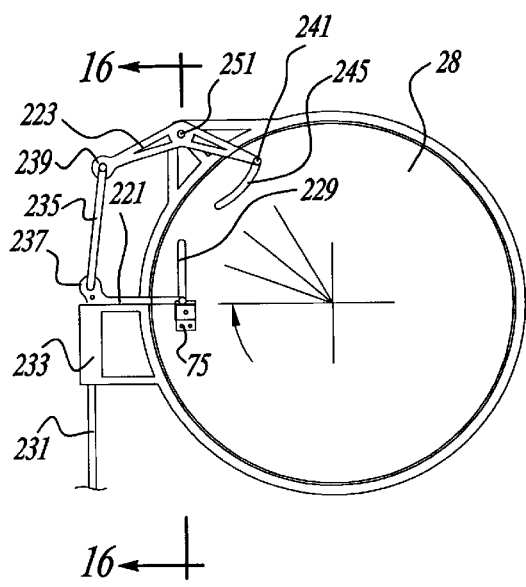
_Fig-12_
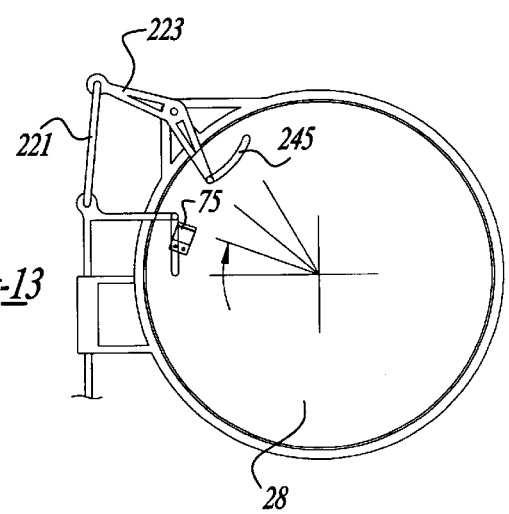
_Fig-13_
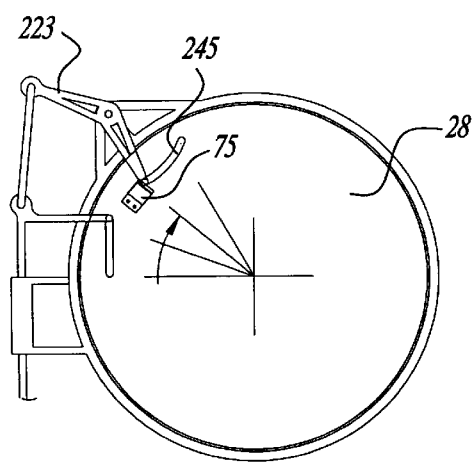
_Fig-14_
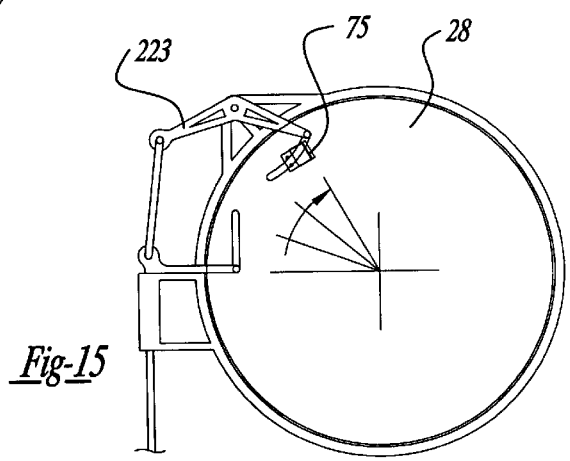
_Fig-15_ ically to a multi-functional apparatus
employing a flexible drive element for selectively actuating
multiple output systems in an automotive vehicle.

MULTI-FUNCTIONAL APPARATUS EMPLOYING A FLEXIBLE DRIVE ELEMENT FOR SELECTIVELY ACTUATING MULTIPLE OUTPUT SYSTEMS

BACKGROUND OF THE INVENTION

This invention relates generally to multi-functional apparatuses and specifically to a multi-functional apparatus employing a flexible drive element for selectively actuating multiple output systems in an automotive vehicle.

Almost all automotive vehicles have a single or a pair of windshield wiper assemblies. These assemblies traditionally include rubber wiper blades mounted upon claw brackets. These claw brackets are attached to wiper arms mounted upon rotating shafts. These shafts are either directly driven by electric motors or driven by a single electric motor which actuates series or parallel-coupled four-bar linkage mechanisms. It is further known to provide a wiper system, in combination with a wash device, to clean headlamps for automotive vehicles.

It is also common to employ a window wiper assembly for cleaning rear windows of automotive vehicles. Typically, these types of rear window wiper assemblies include a wiper blade mounted upon a bracket which is coupled to a wiper arm. The wiper arm is attached to a wiper shaft rotatably driven in a cyclical oscillating manner by a worm gear. A reversible, fractional horsepower, dc electric motor serves to actuate the worm gear through an armature shaft-mounted worm gear enmeshed therewith. This type of rear window wiper arrangement is usually mounted upon a pivoting liftgate of a minivan, station wagon, sport-utility vehicle or the like. Examples of conventional window wiper assemblies and motor mechanisms are disclosed with the following U.S. Pat. Nos.: 4,893,039 entitled "Windshield Wiper Motor" which issued to Isii on Jan. 9, 1990; 4,878,398 entitled "Driving Device for Window Wiper of Motor Vehicles" which issued to Heinrich on Nov. 7, 1989; 4,336,482 entitled "Rear Window Wiper Motor Control" which issued to Goertler et al. on Jun. 22, 1982; 4,259,624 entitled "Arrangement for Wiping a Vehicle Window" which issued to Seibicke on Mar. 31, 1981; 3,694,723 entitled "Motor Vehicle Windshield Wiper Having a Parking Position Outside the Wiper Area" which issued to Schneider et al. on Sep. 26, 1972; and, 3,665,772 entitled "Windshield Wiper Motor Link Depressed Park Mechanism" which issued to Beard et al. on May 30, 1972. All of these patents are incorporated by reference herein.

Some conventional vehicles also provide a rear window release lock or latch, actuated by a solenoid, which can be unlocked to allow for upward pivotal movement of the rear window in relation to the otherwise stationary liftgate. In combination therewith, a separate liftgate lock is often mounted upon the liftgate door for fastening the liftgate to the body to prevent inadvertent pivotal opening. This liftgate lock is traditionally operated by manual key or handle rotation, or through a separate electric motor or solenoid.

Additionally, separate motors and solenoids are required to actuate passenger door locks, an antenna retraction mechanism, headlamp cover retraction mechanisms, a fuel filler door lock and other similar functions. The traditional need for such a multiplicity of electromagnetic devices has increased the automotive vehicle weight and cost while further proving difficult to package within the often small spaces provided. This added weight is especially detrimental when the window wiper mechanism, rear window lock and liftgate lock, as well as their distinct respective electromagnetic devices, are all incorporated within the pivoting liftgate. Not only is the piece cost increased due to this multiplicity of electromagnetic devices, but the assembly cost, part number proliferation and handling costs, electrical wiring costs, objectional motor noise, and failure modes are increased.

Furthermore, U.S. Pat. No. 3,688,332 entitled "Mechanism for Opening and Closing a Cover for a Concealed Windshield Wiper System" which issued to Bellware on Sep. 5, 1972, discloses a windshield wiper driven by an electric motor and an interruptable driving connection controlled by a separate electromagnet. This device further employed levers and pivot pins to open and close a cover.

More recently, WO 96/33891 entitled "Multi-Functional Apparatus Employing an Intermittent Motion Mechanism," WO 96/33893 entitled "Multi-Functional Apparatus Employing an Electromagnetic Device," and WO 96/33892 entitled "Control System for an Automotive Vehicle Multi-Functional Apparatus," all of which were published on Oct. 31, 1996, disclose a significantly improved system wherein a single electromagnetic device can selectively operate intermittent motion mechanisms coupled to a window wiper, a door lock, a window release lock and the like. Notwithstanding, these devices require further refinement and improvement. For example, if the window wiper is frozen onto a window, a door could not be unlocked, with the geneva and starwheel mechanism constructions. Moreover, a car wash or bumpy road could cause the window wiper to undesirably and destructively move from its parked position when a wiper clutch is disengaged, for the split-shaft clutch construction. The split-shaft clutch embodiment also requires further improvements and refinements to increase the durability and robustness of design, while further minimizing the weight of the unit. Furthermore, many of these known devices must translate rotary motion generated by a spinning electric motor and the associated gearing to linear movement for use with door locks and window release latches through use of extraneous gears and levers.

SUMMARY OF THE INVENTION

In accordance with the present invention, the preferred embodiment of a multi-functional apparatus employing a flexible drive element for selectively actuating multiple outputs includes an electromagnetic device and a flexible drive element with a plurality of members thereon. In another aspect of the present invention, a flexible closed loop drive element in response to selective energization of an electric motor, and at least one rotatable member is coupled to one accessory such as a window wiper. The member attached to the drive elements are arranged in a loop motion or discontinuous manner and selectively engage the rotatable member and thus actuate the attached accessory. A further aspect of the present invention provides a second accessory, actuatable by discontinuous members on a drive element. Still another aspect of the present invention allows discontinuous drive members on a flexible element to slide pass a rotatable member in a lost motion manner and, therefore, not actuate the respective accessory.

In a further aspect of the present invention, the respective accessories includes a window wiper, a door lock/unlock or latch device and/or a window release latch.

The apparatus of the present invention is advantageous over known devices in that the window and door can be unlocked even if the window wiper is frozen onto the window. Furthermore, the present invention is advantageous by pinning or securing the window wiper in a park position even when the same electromagnetic device that would otherwise operate the wiper is alternately actuating a lock. This is accomplished by having the single electromagnetic device selectively drive bead like members to a particular apparatus and thereby operate the apparatus. The present invention also increases the durability and robustness of the multi-functional unit while minimizing weight. The multi-functional apparatus of the present invention is especially beneficial in providing flexibility of packaging and mounting of the electromagnetic device; in other words the electromagnetic device can be remotely located away from all of the driven output systems or accessories.

The multi-functional apparatus of the present invention is also advantageous over conventional systems since the present invention combines many different functions into a single apparatus. For example, the present invention multi-functional apparatus replaces the traditional separate rear wiper motor, liftgate lock/unlock motor or actuator, and rear window unlock solenoid. Accordingly, the present invention multi-functional apparatus significantly reduces the piece cost, assembly cost, part proliferation and handling costs, and wiring costs as compared to conventional constructions. Furthermore, the multi-functional apparatus of the present invention significantly reduces weight and packaging space requirements while increasing the electrical and mechanical reliability of the affected systems. Objectional motor and solenoid noises are also reduced. Furthermore, pulleys may be located at strategic points where needed. Thus, heavy and cumbersome cables are not needed and power to operate these devices is reduced.

Additional advantages and features of the present invention will become apparent from the following description and appended claims, taken in conjunction with the accompanying drawings.

BRIEF DESCRIPTION OF THE DRAWINGS

FIG. 3 is a perspective view showing a door lock/unlock mechanism used in the first preferred embodiment multi-functional apparatus of the present invention;

FIG. 4 is a fragmentary front elevational view showing a door lock/unlock pulley assembly of the first preferred embodiment multi-functional apparatus of the present invention, rotating in a first direction;

FIG. 5 is a fragmentary front elevational view showing the door lock/unlock pulley assembly of the first preferred embodiment multi-functional apparatus of the present invention, rotating in a second direction opposite FIG. 4;

FIG. 6 is a fragmentary front elevational view showing a wiper pulley assembly of the first preferred embodiment multi-functional apparatus of the present invention, at the end of a wiping motion;

FIG. 7 is a diagrammatic view showing the wiper pulley assembly of the first preferred embodiment multi-functional apparatus of the present invention, at the start of the wiping motion;

FIG. 8 is a fragmentary front elevational view showing the wiper pulley assembly of the first preferred embodiment multi-functional apparatus of the present invention, at a park position;

FIG. 9 is a fragmentary front elevational view showing a rear window release latch pulley assembly of the first preferred embodiment multi-functional apparatus of the present invention, rotating the pulley in a first direction;

FIG. 10 is a fragmentary front elevational view showing the rear window release latch pulley assembly of the first preferred embodiment multi-functional apparatus of the present invention, rotating in an second direction opposite FIG. 9;

FIG. 12 is a diagrammatic view of a one-way lock/unlock mechanism of the preferred embodiment multi-functional apparatus of the present invention;

FIG. 13 is a diagrammatic view of a one-way lock/unlock mechanism of the preferred embodiment multi-functional apparatus of the present invention;

FIG. 14 is a diagrammatic view of a one-way lock/unlock mechanism of the preferred embodiment multi-functional apparatus of the present invention;

FIG. 15 is a diagrammatic view of a one-way lock/unlock mechanism of the preferred embodiment multi-functional apparatus of the present invention;

FIG. 18 is a diagrammatic view of a one-way torque clutch showing an alternate embodiment of the multi-functional apparatus of the present invention;

FIG. 19 is a perspective view of a pulley of the multi-functional apparatus of the present invention.

DETAILED DESCRIPTION OF THE PREFERRED EMBODIMENT

Figure 1:
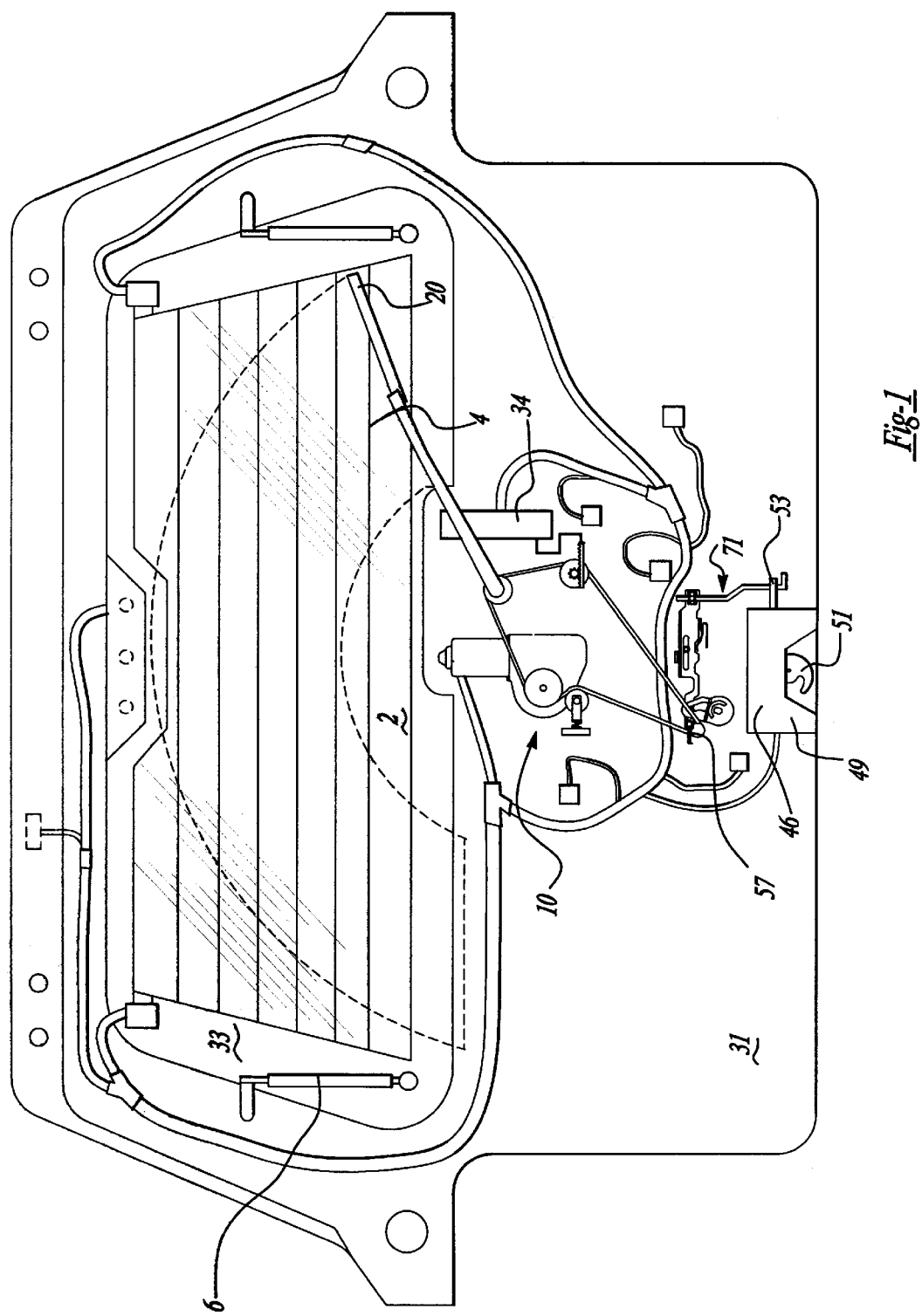
FIG. 1 is a front elevational view showing the first preferred embodiment multi-functional apparatus of the present invention.

An automotive vehicle, such as a minivan, sport utility vehicle or the like, has a rear liftgate door 31 which can pivot about a generally horizontal, hinging pivot axis. When the liftgate is pivoted to an open position, a cargo space or passenger compartment is accessible from behind the vehicle. Such an arrangement is shown in FIG. 1. Liftgate 2 has a rear window backlite 2 which is pivotable between a closed position, substantially flush with the outer surface of liftgate 2, to an open position, about a generally horizontal pivot axis. A pair of pneumatic cylinders 6 act to push window 2 toward the open position when a lower portion of window 2 is released.

Figure 2:
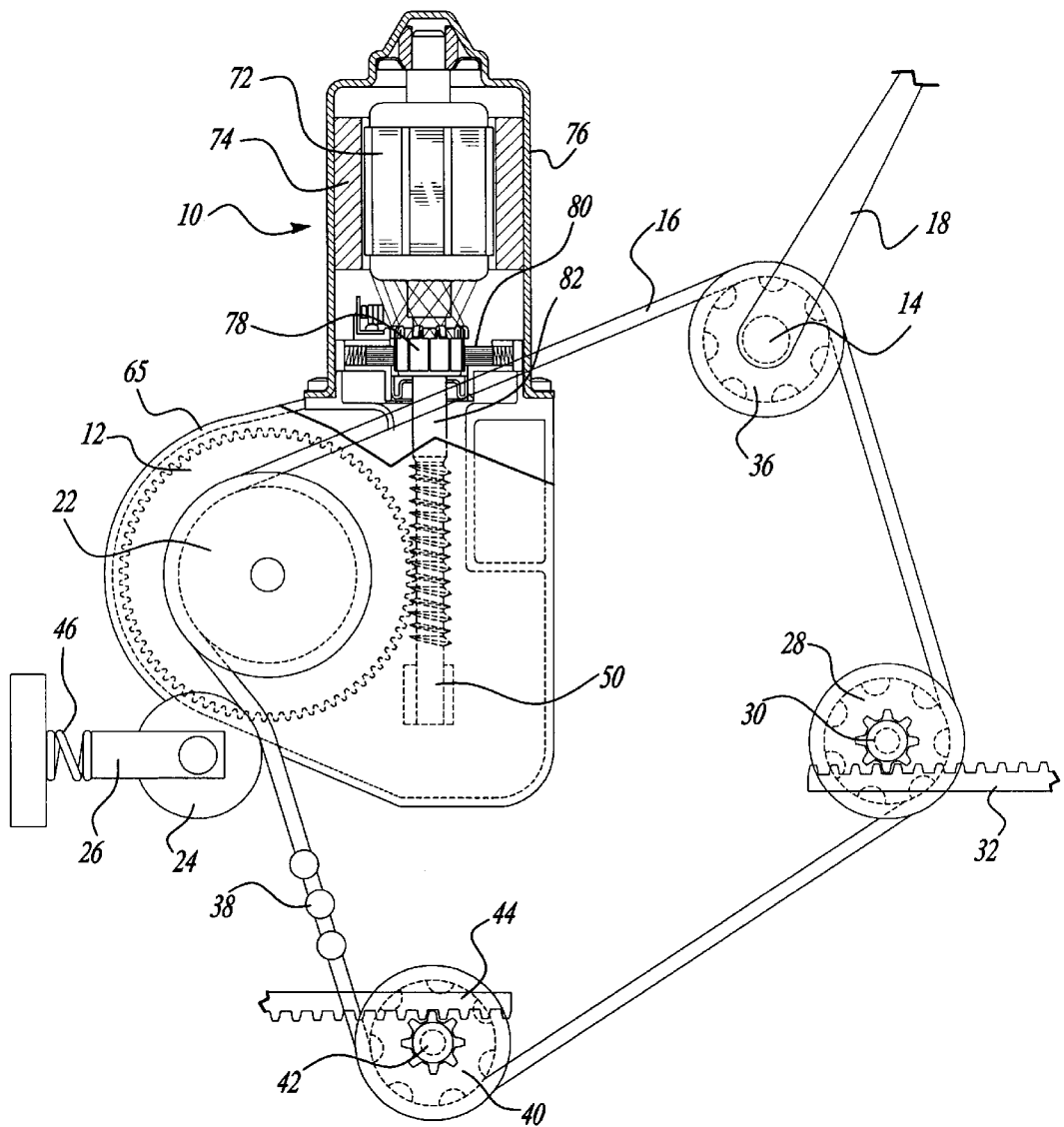
FIG. 2 is a front elevational view showing the first preferred embodiment multi-functional apparatus of the present invention.

The first preferred embodiment of a multi-functional apparatus of the present invention is mounted upon an inner surface of liftgate 2. The majority of the apparatus is hidden by an interior trim panel (not shown). Referring to FIG. 2, multi-functional apparatus includes a fractional horsepower, direct current electric motor 10, a helical worm gear 12, a wiper pulley 36, a door lock/unlock or latch pulley 28 and a window release pulley 40.

The construction of central drive and power transmission unit 43 is best illustrated in FIG. 2. An electric motor 10 is of a conventional 12 volt fractional horsepower, dc electromagnetic variety having a metallic motor housing 76 within which are stationary permanent magnets 74, a rotatable armature 72 with wire windings, a rotatable armature shaft 82 joined to armature 72, a commutator 78 electrically connected to the wire windings and rotatable with armature shaft 82, a brush card assembly 80 and various electronic components, bushings and retainers. It will be appreciated to those skilled in the art that other electric motor constructions can readily be substituted for that shown. A worm gear segment 65 is provided upon a portion of armature shaft 82 extending beyond motor housing 76.

Worm gear 12 has an external set of helically oriented teeth projecting entirely therearound for meshing with a worm gear segment 50. A generally V-cross sectionally shaped drive pulley 22 is mounted upon a face of and concurrently rotates with worm gear 12. A second V-drive pulley 24 is pivotally attached to a rigid foundation such as the vehicle body by armature 26 and is positioned adjacent to V-drive pulley 22 in a spring biased manner. Spring 46 pushes armature 26 so as to cause spring pulley 24 to compress against drive pulley 22. Worm gear 12 is coaxially aligned with drive pulley 22 for rotation about their respective journalling pins. Worm gear 12 is preferably injection molded from a polymeric material such as Acetyl. An electrically conductive feedback disk is retained to an inside face of worm gear 12 through ultrasonic welding or insert molding. Feedback disk is comprised of a set of copper alloy or brass alloy stamped contacts which are provided with differing conductive and nonconductive patterns depending on the specific positional ranges as disclosed in PCT publication for WO 96/33892. Alternatively, a hall effect transistor could be used in place of mechanical contacts. An electronic control unit, such as a microprocessor, mounted to electric motor 10 determines the position of worm gear 12 and selectively energizes electric motor 10 to rotate worm gear 12 a predetermined amount to selectively actuate the multiple output systems.

A power transmission assembly employs three intermittent rotary motion mechanisms. Each rotary motion mechanism includes a pulley and is in mechanical engagement by cable 16.

A window wiper shaft 14 is selectively coupled to gear 12 (as shown in FIGS. 1 and 2) by way of a closed loop, braided wire cable 16 and pulley 36 for rotating a rear window wiper arm 18 and wiper blade 20 in an oscillating manner from a first wiping position to a second wiping position on window 4. Wiper shaft 14, arm 18 and blade 20 are also rotatable to a park position, removed from window 4. Movement of wiper blade 20 to the park position allows free opening and closing of window 2 without interference of wiper 20.

Door lock/unlock pulley 28 (as shown in FIG. 4 and 5) has a pinion gear 30 attached thereto. Pinion gear 30 is enmeshed to gear teeth of a rack 32 such that upon rotation of pulley 28, pinion rack 32 travels in a linear direction. This allows linear movement for actuation of the lock/unlock mechanism as will be discussed. Alternatively, a push/pull rod link or other mechanism may be employed.

Likewise, window release pulley 40 has a coaxially mounted window release pinion gear 42 enmeshed to a window release rack 44. This is illustrated in FIGS. 2 and 9. Upon rotation of window release pulley 40 and the window release pinion gear 42, window release rack 44 is moved in a linear direction thereby supplying linear movement for a window release drive as will be discussed.

As shown in FIG. 2, closed loop, braided wire cable 16 is flexible with bead-like members 38 crimped or molded onto the cable in a discontinuous or selectively spaced arrangement. Preferably, the bead-like members are plastic spherical elements which are molded on to the belt. Alternately, the closed loop, braided wire cable 16 may be made of any flexible polymeric, metal or stiff fabric material such as a belt, chain, cord, sunroof-type cable with flocking and wire wound around a metal core, or the like. The members 38 are of a suitable diameter to engage recesses in the pulleys (as shown in FIG. 19). The closed loop, braided wire cable 16 preferably forms a closed loop whereby each pulley, including the drive pulley 22, is located along this path, but may alternately have disconnected ends and be pushed and pulled in a longitudinal manner.

The pulleys are in sliding engagement with the closed loop, braided wire cable 16 when the bead-like members 38 are not engaged with the pulleys wherein a lost motion function is provided between element groups. Therefore, when bead-like members 38 are not engaged with the pulleys, the pulleys do not rotate. The bead-like members are any dislocation different than the configuration of the belt that allows engagement of a pulley by the dislocations but not by the closed loop, braided wire cable 16 itself.

The operation of the multi-functional apparatus may be best understood by referring to FIGS. 2 and 4–8. In FIG. 2, V-drive of spring pulley 24 presses cable 16 against V-drive of drive pulley 22 by spring member 46. Electric motor 10 drives drive pulley 22, which is frictionally engaged to drive closed loop, braided wire cable 16, and drives cable 16 around a closed path. Bead-like members 38 first partially enter notches of wiper pulley 36. In this position, the wiper blade is moved approximately 6 degrees from a depressed park position to the beginning of the window wipe range (as shown in FIG. 7). FIG. 6 shows wiper pulley 36 and wiper window release pinion gear rotated. Pulley 36 can be rotated 180 degrees to the completion position at the end of the normal window wipe range. Electrical polarity is then reversed to motor 10 such that rotation of pulley is reversed back to its initial position as shown in FIG. 7. Referring to FIG. 8, wiper pulley 36 is further rotated such that the wiper assembly is moved to the depressed wiper arm parking position. The wiper blade 20 is thus moved off the rear liftgate window such that the wiper blade 20 is supported on a bracket upon the liftgate door. This allows for free, non-interfered movement of the liftglass window as will be discussed hereinafter. When bead-like members 38 do not engage pulley, cable 16 merely slides around periphery of pulley, thereby not rotating pulley 36 and wiper 18.

It may advantageous to alternately provide a clutching mechanism which supplies sufficient friction such that when cable 16 slides around a pulley, the pulley does not move. However, it is desirable that when torque is produced to the pulley, not by the cable but instead by rack or any manual movement of the attached accessory, the pulley is able to be easily moved. Such a one way torque transmission device is generally illustrated in FIG. 18. FIG. 18 shows a one way torque clutch generally comprising outer ring 52, drive ring 58, driven shaft 56, and pins 54. In this device, any pinion gear would mechanically attach to drive ring 58 and the pulley would be mechanically attached to driven shaft 56, whereby rotation of the pulley causes rotation of driven shaft 56 and rotation of the pinion gear causes rotation of drive ring 58. By driving drive ring 58 through manual operation of accessory, space 60 is closed and driven shaft 56 is rotated. The closing of space 60 causes relative rotation between drive ring 58 and driven shaft 56, whereby pins 54 are pushed into the larger portion of space 62. Therefore, pins 54 do not bind between outer portion 52 and driven shaft 56 which would cause high friction to operate shaft 56. When torque is supplied in the opposite direction, by driven shaft 56 and rotation of pulley, space 60 is decreased in an opposite direction, whereby pins 54 are allowed to roll in a smaller space of space 62. Therefore, pins 54 lodge between outer portion 52 and driven shaft 56 causing large friction there between.

FIGS. 4 and 5 show operation of the lock/unlock intermittent motion mechanism. Clockwise movement (as illustrated in FIG. 4) of lock/unlock pulley 28 causes lock/unlock window release pinion gear 30 to drive lock/unlock rack 32, in turn driving the liftgate lock or latch associated therewith to also be moved from a latched to an unlatched orientation.

Motor 10 can then be reversed to move lock/unlock pulley 28 and lock/unlock window release pinion gear 30 in a counterclockwise (as illustrated) direction causing lock/unlock rack 32 to move in the opposite linear direction. This causes liftgate latch to move from an unlatched orientation to a latched orientation.

To lock, rack 32 slides door lock control member 75 to a locked and latching position as is shown in FIG. 3. In this locked position, handle protrusion 101 can freely move within clearance notch 157 without sufficiently abutting against and pivoting door lock control member 75 to cause unlatching. Furthermore, tensioning spring 79 engages detent notch 161. Also, pivot post 121 has been linearly slid along slot 127 and cam follower 81 has moved along the slot defined by internal edge 207 in a lost motion manner.

When unlocking is desired, rack 32 is reversed (as discussed above) and pin 129 is pushed causing door lock control member 75 to move to an unlocked position.

Figure 20:
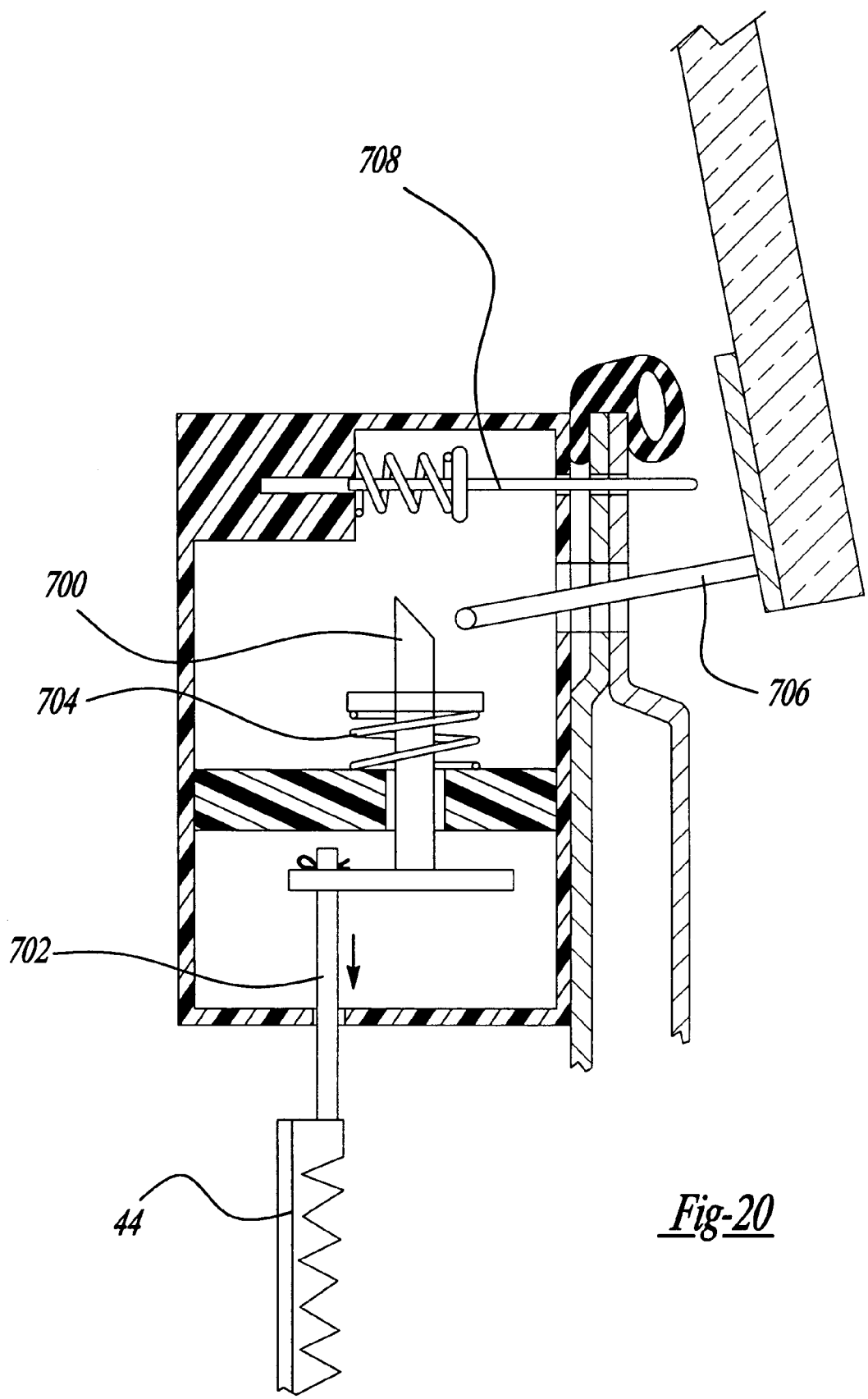
FIG. 20 is an elevational view of a window release latch in accordance with the multi-functional apparatus of the present invention.

In FIG. 9, bead-like members 38 are moved to the beginning of a liftgate window release positional range. In this position, bead-like members 38 engage window release pulley 40 causing window release pulley 40 to rotate in a clockwise direction. The clockwise rotation, as shown in FIG. 9, of window release pulley 40 causes window release pinion gear 42 to rotate forcing window release rack 44 to move in a linear direction. Linear movement of window release rack causes the liftgate window to be released. As shown in FIG. 20, the window release mechanism generally comprises rack 44 attached to pin 700 by member 702. When rack 44 moves pin 700 left (as illustrated in FIG. 20), pin 702 compresses spring 704 which releases member 706 allowing spring loaded pin 708 to push window clear. The window may then be relatched by manually pushing window 2 and member 706 back down and engaging pin 700 to member 706. Of course, it will be appreciated that the previously discussed positional ranges may have alternate patterns and arrangements, and may include additional or replacement functions.

Figure 11:
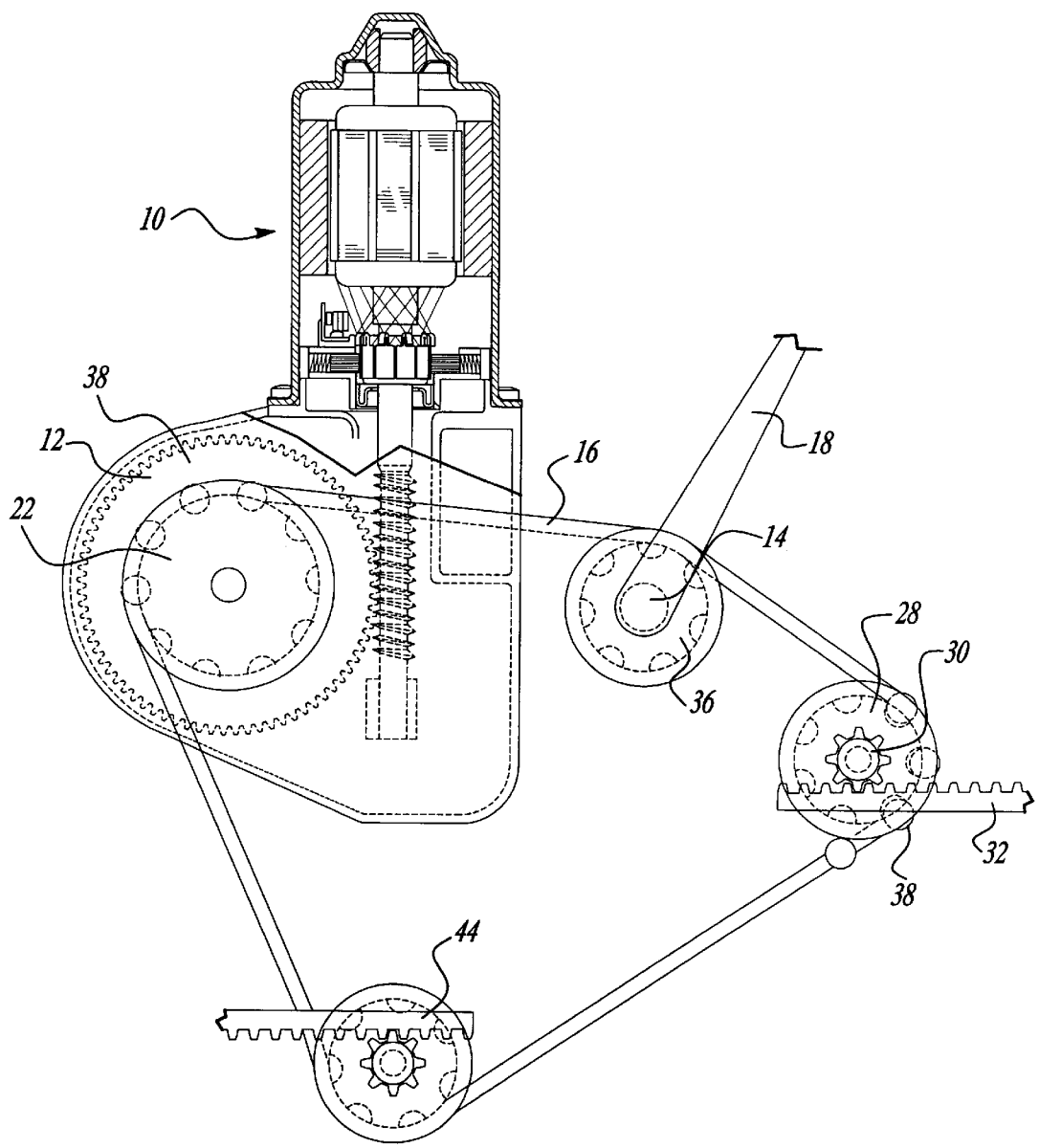
FIG. 11 is a front elevational view showing a second preferred embodiment multi-functional apparatus of the present invention with a second plurality of bead like members.

In a second preferred embodiment as shown in FIG. 11, distinct groups of bead-like members 38 are preferably molded onto cable 16 at two separate locations. Electric motor 10 drives drive pulley 22 which has bead-like member indentations on its periphery. Whereby drive pulley 22 drives a first bead-like member set causing closed loop, braided wire cable 16 to move along path. A second bead-like member set is located at a position accessible to the various pulleys to allow rotation of their respective accessories. By driving second bead-like member set 38, the need for friction drive is eliminated and more torque may be generated to be applied to the respected pulleys. Driving bead-like member set 38 may extend along in belt 16 such that the same bead-like member set is used to drive the belt and engage the respective pulley. A factor in determining the position of elements along the closed loop, braided wire cable is to insure that only the electric motor 10 and one respective selected pulley is engaged by bead-like member set 38.

It may be desirable to have a one way lock/unlock function or one way operation in which a pulley may be rotated in the same direction to actuate an attached apparatus in both directions. For instance, with this device, lock/unlock pulley could be rotated clockwise to actuate both the locking and unlocking functions. By this method, more pulleys may be located along the cord 16 and more versatility of the system, as a whole, may be found.

General operation of the one way pulley is now disclosed in FIGS. 12–17. As shown in FIG. 12, a primary lock linkage 221 and a secondary lock linkage 223 are coupled to a liftgate lock 46 (see FIG. 1) through a connecting rod. Primary lock linkage 221 is bent steel wire located within a slot 229 of lock/unlock pulley 28. A median segment 231 is slidably trapped within a support 233 extending from drive pulley 22. A C-shaped bent wire 235 couples an elbow 237 of primary lock linkage 221 to a distal end 239 of secondary lock linkage 223. Secondary lock linkage 223 is pivotable about a central fulcrum 251 mounted to pulley 28. Wire 235 can be pivotally joined to primary and secondary lock linkages, respectively 221 and 223, via bent metal wire clips, polymeric force-fit collars, push nuts or the like. Linkages 221 and 223 may also be coupled to their respective connecting rods through similar fasteners. Lock linkages 221 and 223 are also considered to act as intermittent motion mechanisms based on their selectively actuated operation as will be discussed hereinafter. Linkages 221 and 223 may alternately be constructed as pivoting or sliding members, having an infinite variety of shapes, and constructed from plastic, cast metal, powdered metal, bent wire, geared members or the like. It should further be understood that the connecting rods may be substituted by cables, belts, gears, a plurality of mechanical linkages, chains, jackscrews or other force transmitting and coupling means.

Figure 16:
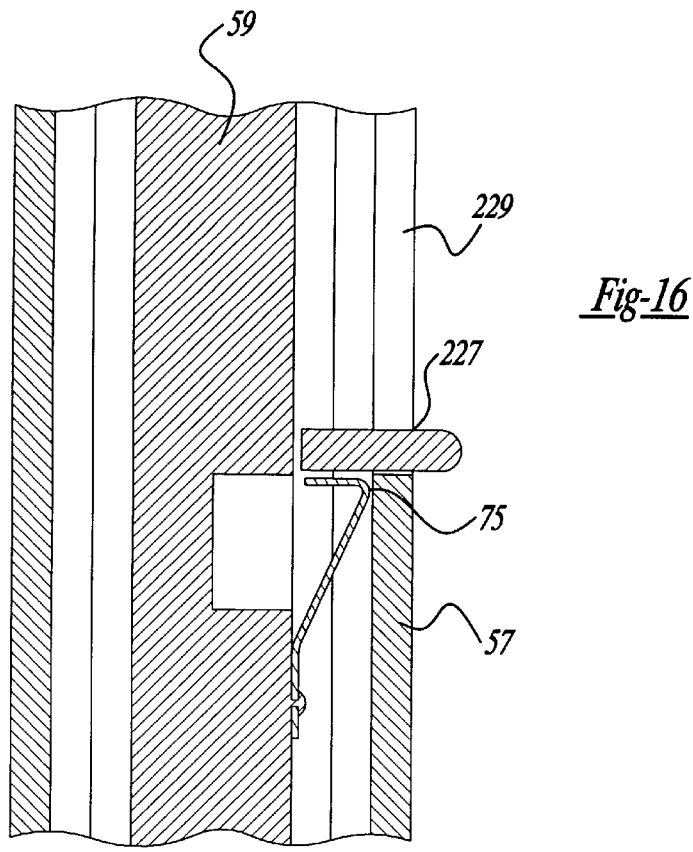
FIG. 16 is a cross-sectional view of a pulley with the lock/unlock mechanism of the preferred embodiment multi-functional apparatus of the present invention.
Figure 17:
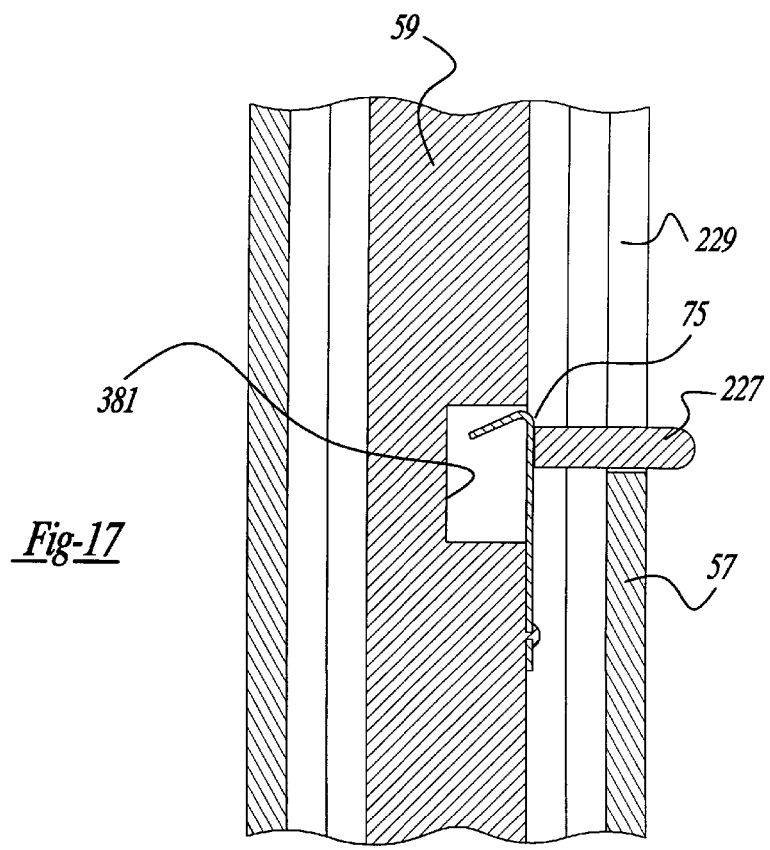
FIG. 17 is a cross-sectional view of a pulley with the lock/unlock mechanism of the preferred embodiment multi-functional apparatus of the present invention.

If the liftgate lock switch is activated, and the one way lock mechanism is employed, then an electronic control unit causes motor 10 (see FIG. 1) to rotate lock/unlock pulley 28 and spring tab 75 through liftgate locking positional range. Accordingly, spring tab 75 moves from the orientation shown in FIG. 12 to that shown in FIG. 13. As shown in FIG. 13, spring tab 75 acts to directly contact and push leading end 227 (as shown in FIG. 16) of primary lock linkage 221 upward along slot 229. This motion, in turn, causes primary lock linkage 221 to move connecting rod and actuate liftgate lock 6 to a locked orientation. Concurrently therewith, secondary lock linkage 223 is caused to pivot. Electronic control unit again senses the conductive pattern position of the feedback disk through contractors such that when spring tab 75 reaches the position of FIG. 13, motor 10 is subsequently reversed. This returns spring tab 75, lock/unlock pulley 28 and actuator shaft back to parking position. Therefore, the wiper operational mode can be quickly resumed if desired.

When the liftgate unlock switch setting is activated, electronic control unit will energize motor 10 so as to rotate lock/unlock pulley 28 and spring tab 75 mounted thereto to a liftgate unlock positional range, also shown as the movement between FIGS. 14 and 15. Accordingly, spring tab 75 directly contacts and moves pin 241 of secondary lock linkage 223 to upwardly pivot along slot 245. In turn, primary lock linkage 221 is returned to its initial position and connecting rod 225 and liftgate lock 46 (as shown in FIG. 1) are given an unlocked orientation thereby allowing for manual opening of liftgate 31 by way of a liftgate mounted door release. Upon sensing the completion of liftgate unlock positional range, electronic control unit causes motor 10 to return spring tab 75, lock/unlock pulley 28 back to its parking position.

It is understood that other one way rotational devices achieving the same desired results may be used in place of the before-mentioned apparatus. Furthermore, these devices may be used on other pulleys, multiple pulleys and other apparatuses not disclosed herein to achieve the same results.

Electric motor 10, which drives closed loop, braided wire cable and the corresponding pulleys, is controlled by the electronic control unit. The electronic control unit includes a rear node microprocessor preferably using a Motorola MC6HCO5V6 (or alternately MC6HCO5V7) chip mounted upon a rigid printed circuit board. Rear node electronic control unit is electrically connected to a central body microprocessor or control unit (not shown) in a multiplexed (MUX) fashion through a wire harness. A J1200 MUX protocol is used. The microprocessor allows for energization of electric motor 10 through leads in response to various wiper activation inputs received from the main body microprocessor, a liftgate mounted lock switch, a liftgate mounted liftglass release button switch and various other ajar and positional switches. Three active electrical contractors plus a common ground ride against the conductive pattern of feedback disk for sensing the rotational position of worm gear 12 and motor 10 (see FIG. 2). Feedback discs may also be positioned on lock/unlock pulley 28, wiper pulley 36 and window release pulley for sensing their rotation. Rear node microprocessor will translate the monostropic code (i.e.: requiring only a single bit to change when feedback disk passes from any positional range to an adjacent positional range) pattern input signals from contractors into a gray binary code. Upon reaching the completion of the window wipe positional range, upon reaching the completion of the liftgate window release positional range or upon receiving a vehicle occupant created signal from the central body microprocessor, rear node microprocessor will actuate a normally closed relay allowing for a reversal of the electrical polarity, and thus rotational direction of the armature 26 within motor 10 (see FIG. 2).

While various embodiments of this multi-functional apparatus have been disclosed, it will be appreciated that various modifications may be made without departing from the present invention. For example, a solenoid, electromagnet or other electromagnetic devices may be used in place of the previously described electric motor 10. Furthermore, additional window release spur gears, pinion gears, sector gears, planetary gears, jack screws, sprockets and chains, pulleys and belts, cables or other force transmitting means may be employed to couple between the electromagnetic device, rotatable member, intermittent motion mechanisms or locks. Moreover, a multiple gear transmission, linkage, belt or cable system can alternately couple a wiper assembly to the wiper shaft. It will further be appreciated that a variety of other multiplexed or non-multiplexed, microprocessor or analog circuitry may be used to control the apparatus of the present invention. Other intermittent motion mechanisms may also be actuated by interfacing with the members in place of the driven pulleys. For example, rotating levers, Geneva mechanisms, sector gears, escapements, ratchet mechanisms, bent wires can be used. The multi-functional apparatus of the present invention can further be employed for windshield wipers, side door locks or other automotive vehicle and non-automotive vehicle applications. Moreover, the present invention can operate a backlite wiper in a hatchback or fixed backlite sedan. While various materials and force transmitting members have been disclosed, a variety of other such materials and force transmitting devices may be used. It is intended by the following claims to cover these and any other departures from the disclosed embodiments which fall within the true spirit of this invention.

The invention claimed is:

1. A multi-function apparatus for use in an automotive vehicle, said apparatus comprising:
    a flexible drive element;
    at least one member affixed to and protruding from said element;
    an electromagnetic device operably driving said element; and
    at least a first intermittent motion mechanism selectively coupled to said electromagnetic device by said element when said member is engaged with said first intermittent motion mechanism, said first intermittent motion mechanism being selectively decoupled from said electromagnetic device when said member is disengaged from said first intermittent motion mechanism.

2. The apparatus of claim 1 further comprising:
    a second intermittent motion mechanism selectively coupled to said electromagnetic device by said element when said member is engaged with said second intermittent motion mechanism, said second intermittent motion mechanism being selectively decoupled from said electromagnetic device when said member is disengaged from said second intermittent motion mechanism, and
    a third intermittent motion mechanism selectively coupled to said electromagnetic device by said element when said member is engaged with said third intermittent motion mechanism, said third intermittent motion mechanism being selectively decoupled from said electromagnetic device when said member is disengaged from said third intermittent motion mechanism.

3. The apparatus of claim 2 wherein said first intermittent motion mechanism is a motor vehicle rear wiper, said second intermittent motion mechanism is a motor vehicle rear window unlock device, and said third intermittent motion mechanism is a rear liftgate lock/unlock device.

4. The apparatus of claim 1 wherein said element defines a closed loop.

5. The apparatus of claim 1 further comprising a plurality of said members located along a selected portion of said flexible drive element.

6. The apparatus of claim 1 further comprising a plurality of said members located along a plurality of isolated portions of said element.

7. The apparatus of claim 1 further comprising:
    a first pulley having a groove frictionally engaging said flexible drive element, said electromagnetic device operationally rotating said first pulley;
    a second pulley positioned coaxially and adjacent to said first pulley, said second pulley having a groove frictionally engaging said flexible drive element; and
    a spring member connectable with said second pulley to drive said second pulley toward said first pulley, said flexible drive element being located between said first pulley and said second pulley to allow frictional engagement of said flexible drive element.

8. The apparatus of claim 1 further comprising:
    a pulley coupled to said electromagnetic device, said pulley frictionally engaging said flexible drive element, whereby said electromagnetic device operably drives said flexible drive element with said pulley;

a feedback disc mounted to a face of said pulley;

an occupant accessible switch operably providing an electrical signal;

an electrical control unit electrically connected to said feedback disc, said electromagnetic device, said occupant accessible switch, and said intermittent motion mechanism, said unit reading a feedback signal from said feedback disc indicative of a location of said pulley, said electromagnetic device providing a motor signal indicative of a rotational position of said electromagnetic device, said unit reading an intermittent motion signal from said intermittent motion device indicative of an operational position of said intermittent motion device, said unit selectively controlling power to said motor drive based on said feedback signal, said electric signal, said motor signal and said intermittent motion signal.

9. The apparatus of claim 1 further comprising a locking member coupled to said first intermittent motion mechanism.

10. The apparatus of claim 9 wherein said locking member is a door lock and said electromagnetic device is remotely spaced away from said locking member.

11. The apparatus of claim 9 wherein said electromagnetic device is an electric motor.

12. The apparatus of claim 1 further comprising a wiper coupled to said first intermittent motion mechanism.

13. The apparatus of claim 12 further comprising a window release latch operable in response to selective movement of said element.

14. A multi-function apparatus for use in an automotive vehicle, said apparatus comprising:

an electromagnetic device;

a first intermittent motion mechanism selectively driven by said electromagnetic device, said first intermittent motion mechanism being remotely located from said electromagnetic device; and a second intermittent motion mechanism selectively driven by said electromagnetic device, said second intermittent motion mechanism being remotely located from said electromagnetic device and said first intermittent motion mechanism.

15. The multi-function apparatus as claimed in claim 14 wherein said electromagnetic device is an electric motor.

16. The multifunction apparatus as claimed in claim 14 further comprising a flexible drive element selectively coupling at least one of said intermittent motion mechanisms to said electromagnetic device.

17. The multi-function apparatus of claim 16 wherein said element selectively couples both of said intermittent motion mechanisms to said electromagnetic device.

18. The method of operating a multi-functional apparatus as claimed in claim 13 further comprising moving a locking member in response to activation of said first device.

19. A method of operating a multi-functional apparatus for use in an automotive vehicle having an electric motor, said method comprising:

(a) driving an elongated element along a curved path;

(b) engaging a first device with a member protruding from said element;

(c) selectively activating said first device in response to step (a) when said element is moving; and (d) moving said element and said member in a lost motion manner to selectively deactivate said first device.

20. The method of operating a multi-functional apparatus as claimed in claim 19 further comprising:

(a) engaging a second device with said member protruding from said element;

(b) selectively activating said second device in response to step (a) when said element is moving; and (c) moving said element and said member in a lost motion manner to selectively deactivate said second device.

* * * * *